(12) United States Patent
Yamaguchi et al.

(10) Patent No.: US 6,550,508 B1
(45) Date of Patent: *Apr. 22, 2003

(54) RUBBER COMPOSITION FOR TIRE TREAD HAVING HIGH PERFORMANCE ON ICE AND PNEUMATIC TIRE USING THE SAME

(75) Inventors: Yoichi Yamaguchi, Hiratsuka (JP); Naoya Amino, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/582,633

(22) PCT Filed: Nov. 25, 1999

(86) PCT No.: PCT/JP99/06575

§ 371 (c)(1),
(2), (4) Date: Jul. 26, 2000

(87) PCT Pub. No.: WO00/32689

PCT Pub. Date: Jun. 8, 2000

(30) Foreign Application Priority Data

Nov. 27, 1998 (JP) ............................................ 10-337328

(51) Int. Cl.$^7$ ............................ B60C 7/22; B60C 27/00; C08J 9/32
(52) U.S. Cl. ......................... 152/167; 152/169; 152/210; 152/211; 152/458; 152/209 R; 524/494; 521/54; 521/149; 521/150
(58) Field of Search ............................. 152/209 R, 210, 152/458, 167, 211, 169; 521/54, 149, 150; 524/494; 252/236, 935

(56) References Cited

U.S. PATENT DOCUMENTS 5,591,279 A * 1/1997 Midorikawa et al. .... 152/209.4
6,058,994 A * 5/2000 Amino et al. ................ 152/167

FOREIGN PATENT DOCUMENTS

| JP | 59196328 A |   | 11/1984 |
| JP | 04117439 A |   | 4/1992 |
| JP | 04246440 A | * | 9/1992 |
| JP | 09012770 A |   | 1/1997 |
| JP | 09012778 A |   | 1/1997 |
| JP | 10316801 A |   | 12/1998 |

* cited by examiner

Primary Examiner—David W. Wu
Assistant Examiner—R. Harlan
(74) Attorney, Agent, or Firm—Arent Fox Kintner Plotkin & Kahn PLLC

(57) ABSTRACT

A rubber composition for a tire tread, or a pneumatic tire using the same in a tire tread portion, wherein the tread portion contains a diene rubber; and carbon black and/or silica; and a gas-encapsulated thermoplastic resin and, further, a short fiber, a hard particle and/or a liquid polymer, and wherein the gas-encapsulated thermoplastic resin particle is obtained by expanding, upon heating. at a temperature of an expansion starting temperature thereof or more, prior to vulcanization of a rubber, a thermally expansible thermoplastic resin particle, which comprises a thermoplastic resin having an expansion starting temperature of from 70° C. to less than 120° C. and having a heat resistance to withstand vulcanization of rubber, followed by vulcanization to uniformly disperse the gas-encapsulated thermoplastic resin in the rubber, or a short fiber, a hard particle and/or a liquid polymer is further compounded to give a high frictional force on ice.

16 Claims, 2 Drawing Sheets

US 6,550,508 B1

RUBBER COMPOSITION FOR TIRE TREAD HAVING HIGH PERFORMANCE ON ICE AND PNEUMATIC TIRE USING THE SAME

TECHNICAL FIELD

The present invention relates to a rubber composition for a tire tread. More specifically it relates to a rubber composition for a tire tread comprising a diene rubber having, uniformly dispersed therein, a gas-encapsulated thermoplastic resin particle obtained by expanding upon heating at a temperature of an expansion starting temperature or more, prior to vulcanizing a thermally expansible thermoplastic resin particle containing therein a liquid or solid substance capable of generating a gas by vaporization, decomposition or chemical reaction upon heating, followed by vulcanization, said thermally expansible thermoplastic resin particle comprising a thermoplastic resin having an expansion starting temperature of from 70° C. to less than 120° C. and having a heat resistance to withstand vulcanization of rubber, or a rubber composition for a tire tread further comprising a short fiber, a hard particle and/or a liquid polymer as well as a pneumatic tire having a high frictional force on ice and using the above composition in the tread portion thereof.

BACKGROUND ART

In order to increase the friction force on ice of a pneumatic tire, various proposals have been made heretobefore to formulate a hard foreign substance or a hollow particle into a rubber to thereby form a micro irregularity on the surface of a rubber layer, whereby a water-film present on the surface of the ice is removed during a running of a tire and the friction on the ice is increased, but practically satisfactory results have not been obtained yet. Examples of such proposals are disclosed in, for example, JP-A(Kokai)-60-258235 (i.e., micropowder of ceramic), JP-A-2-274740 (i.e., finely divided plant), and JP-A-2-281052 (i.e., metal). However, according to these proposals, there are caused other problems such as the increase in the hardness of the rubber and the loss of flexibility of the rubber whereby the resultant tire is difficult to follow the contours of the road. Typical examples of formulating hollow particles are disclosed in JP-A-2-170840, JP-A-2-208336 and JP-A-4-5543, but there are problems in these arts that the hardness of the rubber is increased, as mentioned above or the hollow particles are broken during the mixing thereof.

Furthermore, although the application examples are different, JP-A-4-246440 is intended to decrease the weight by stably expanding, during vulcanization, a thermally expansible microcapsule compounded in rubber. However, for the purpose of improving the friction force on ice of a tire tread, since the thermally extensible microcapsule cannot be stably expanded during vulcanization when highly reinforcing filler is compounded for satisfying the requirement of high strength in the case of, for example, a pneumatic tire, it is not expected to form the intended irregularity on the surface of a tread sufficient to improve the friction force on ice.

Under the above-mentioned circumstance, the present inventors previously developed a rubber composition for a tire tread having the improved friction force on ice by compounding elastic gas-encapsulated thermoplastic particle having an average particle size of 5–300 μm, to a diene rubber. Since this gas-encapsulated thermoplastic resin compounded rubber forms irregularity on the surface of a tire tread, has a function capable of effectively removing the water-film and maintain the flexibility of rubber, without increasing the hardness of rubber, the pneumatic tire having a high friction force on ice, since the elastic gas-encapsulated thermoplastic particle is compounded.

However, although these proposals exhibit high friction force on ice, further improvements in the friction force on ice are desired.

DISCLOSURE OF INVENTION

Accordingly, the object of the present invention is to provide a rubber composition for a tire tread having a further increased frictional force on ice and a pneumatic tire using the same.

Another object of the present invention is to provide a rubber composition for a tire tread having a further increased frictional force on ice and capable of preventing the large deformation of a block at a tire tread portion and a pneumatic tire using the same.

A further object of the present invention is to solve all the above-mentioned problems in the prior art and to provide a rubber composition for a tire tread having a light weight and having a flexibility of rubber per se, without increasing the hardness of a rubber and having a remarkably increased friction force on ice by the scratching effect against ice to remove the water-film on the ice and to provide a spike effect on the ice, when used as a pneumatic tire, and also a pneumatic tire using the same.

A still further object of the present invention is to provide a rubber composition for a tire tread, in addition to the improved frictional force on ice, capable of suppressing the migration of a softening agent and of maintaining a high friction force on ice for a long term and a pneumatic tire using the same.

In accordance with the present invention, there is provided a rubber composition for a tire tread comprising:

100 parts by weight of a diene rubber,

30–90 parts by weight of at least one reinforcing filler selected from the group consisting of carbon blacks and silicas, and a gas-encapsulated thermoplastic resin particle having an average particle size of 30–150 μm obtained by expanding 1–20 parts by weight of a thermally expansible thermoplastic resin particle containing therein a liquid or solid substance capable of generating a gas by vaporization, decomposition or chemical reaction upon heating, upon heating at a temperature of an expansion starting temperature or more, prior to the vulcanization of rubber, followed by vulcanization, said thermally expansible thermoplastic resin particle comprising a thermoplastic resin having an expansion starting temperature of from 70° C. to less than 120° C. and having a heat resistance to withstand the vulcanization of a rubber, and a pneumatic tire using the same as a tread portion.

In accordance with the present invention, there are also provided a rubber composition for a tire tread as mentioned above 1 to 20 parts by weight of at least one member selected from the group consisting of a short fiber and a hard particle having a Vickers hardness of 35–1000 and an average particle size of 20 to 500 μm further compounded and a pneumatic tire using the same as a tread portion.

In accordance with the present invention, there is provided a process for producing a rubber composition for a tire tread comprising:

after, or while, uniformly mixing a diene rubber with a thermally expansible thermoplastic resin particle having an expansion starting temperature of from 70° C. to less than 120° C. and having a heat resistance to withstand vulcanization of rubber and containing an encapsulated liquid or solid substance capable of generating a gas by evaporation, decomposition or chemical reaction upon heating, followed by heating at a temperature of the expansion starting temperature of the thermally expansible particle or more to expand the particle, and vulcanizing the expanded particle to uniformly disperse the gas-encapsulated thermoplastic resin particle having an average particle size of 30–150 μm in the rubber.

In accordance with the present invention, there is further provided a rubber composition for a tire tread comprising:

100 parts by weight of a diene rubber;

30–90 parts by weight of at least one reinforcing filler selected from the group consisting of carbon blacks and silicas;

a gas-encapsulated thermoplastic resin particle obtained by expanding, upon heating at a temperature of an expansion starting temperature or more, prior to vulcanization, 1–20 parts by weight of a thermally expansible thermoplastic resin particle containing therein a liquid or solid substance capable of generating a gas by vaporization, decomposition or chemical reaction upon heating, followed by vulcanization, said thermally expansible thermoplastic resin particle comprising a thermoplastic resin having an expansion starting temperature of from 70° C. to less than 120° C. and having a heat resistance to withstand vulcanization of rubber; and 5–55 parts by weight of a liquid polymer having a weight-average molecular weight of 6,000–100,000 and a glass transition temperature (Tg) of −50° C. or less.

BEST MODE FOR CARRYING OUT THE INVENTION

Figure 1:
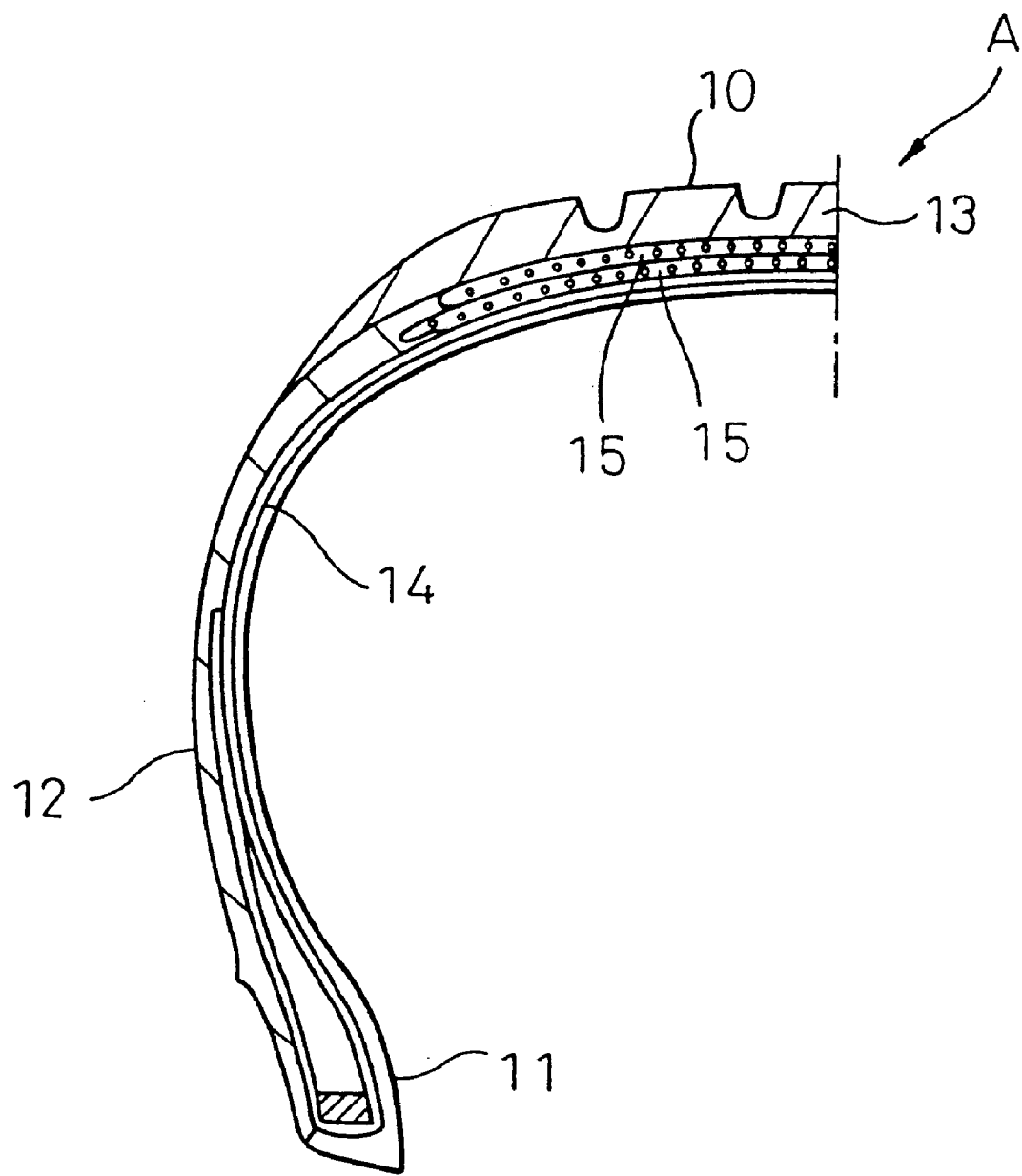
FIG. 1 is a half cross-sectional view along the meridian of an example of a pneumatic tire according to the present invention.

The constitution of the present invention will now be explained in detail with reference to the drawings. FIG. 1 is a half cross sectional view along the meridian of a pneumatic tire according to the present invention.

In FIG. 1, the pneumatic tire A according to the present invention comprises a pair of the left and right side of the bead portions 11, 11, a pair of the left and right sides of the side wall portions 12, 12 connected to the bead portions 11, 11, and the tread portion 13 located between the side wall portions 12 and 12. The carcass layer 14 is arranged between a pair of the left and right sides of the bead portions 11 and 11 and, in the tread portion 13, the belt layer 15 is placed so as to cover the outer circumference thereof. 10 is a surface of the tread. Note that, in this embodiment of the-present invention, the tread portion 13 is composed of the rubber, the gas-encapsulated thermoplastic resin hollow particles, and the short fiber.

According to the present invention, a rubber composition for a tread of a pneumatic tire can be obtained by uniformly dispersing an elastic gas-encapsulated thermoplastic resin having an average particle size of 30–150 μm, optionally together with said short fiber, hard particle and/or liquid polymer, in a vulcanized rubber matrix. This rubber composition can be obtained by, after, or while, mixing a rubber material with a thermally expansible thermoplastic resin particle having an expansion starting temperature of from 70° C. to less than 120° C. and having a heat resistance to withstand vulcanization of a rubber and containing an encapsulated liquid or solid substance capable of generating a gas by evaporation, decomposition or chemical reaction upon heating, and, optionally, the short fiber, hard particle and/or liquid polymer, and heating the mixture at a temperature of the expansion starting temperature of the thermally expansible particle or more to expand the particle, followed by vulcanizing the expanded particle, whereby the rubber composition having the gas-encapsulated thermoplastic resin particle, optionally with the short fiber, hard particle and/or liquid polymer uniformly dispersed in the vulcanized rubber matrix.

The "expansion starting temperature" of the thermally expansible thermoplastic resin particle is meant by those determined according to the following method. Namely, one part by weight of the thermally expansible thermoplastic resin particle is mixed and dispersed in 2 parts by weight of acrylic emulsion and the dispersion is coated on a glass plate so that the thickness is 0.2 mm, followed by allowing to stand in an oven at a predetermined temperature for 1 minute. The glass plate is then taken out from the oven and, after cooling, the thickness was determined. This procedure is repeated at 5° C. intervals and the temperature at which the thickness starts to increase is determined. This temperature is the expansion starting temperature.

As an alternative procedure, the following method is available and the similar expansion starting temperature can be obtained. Thus, a method in which TMA (Thermal Mechanical Analyser) is used. According to this method, a given amount of a thermally expansible thermoplastic resin particle is charged into a couple of the piston cylinder thereof and is heated at a rate of 10° C./min. When the expansion is started, the piston is started to move. This temperature at which the piston is started to move is the expansion starting temperature.

The gas-encapsulated thermoplastic resins usable in the present invention are those obtained by heating a thermally expansible thermoplastic resin particle having a thermal expansion starting temperature of from 70° C. to less than 120° C. and having a heat resistance to withstand the vulcanization of a rubber and containing a liquid or solid substance therein capable of generating a gas by evaporation, decomposition or chemical reaction upon heating at a temperature of the expansion starting temperature or more, normally 100° C.–140° C., whereby the generated gas is included in the shell composed of the thermoplastic resin to form a hollow shape. The resultant gas-encapsulated thermoplastic resin particles have a true specific gravity of preferably 0.1 or less and an average particle size of 30–150 μm, more preferably 50–150 μm.

In order to obtain a vulcanized rubber in which the thermally expansible thermoplastic resin particle in the rubber composition according to the present invention is effectively expanded, the heating temperature more than the expansion starting temperature is applied, prior to the vulcanization of rubber, whereby the thermally expansible thermoplastic resin particle compounded in the composition is allowed to be expanded. Thus, the expanded gas-encapsulated thermoplastic resin particle is not easily broken, during the vulcanization under a high temperature and a high pressure, and therefore, a rubber composition having, uniformly dispersed therein, a gas-encapsulated thermoplastic resin particle having an average particle size larger than that of the particle expanded during the vulcanization. Especially, in the case of a filler (e.g., carbon black) compounding composition, the thermally expansible thermoplastic resin particle can be more effectively expanded.

A volume ratio of the hollow portion of the gas-encapsulated thermoplastic resin particle thus obtained is preferably 2–40%, more preferably 5–35%, especially preferably 10–30%, and most preferably 10–25%. When the volume ratio is too small, the friction force is not sufficiently improved. On the other hand, when the volume ratio is too large, it is not preferable that the abrasion resistance is remarkably decreased, and therefore, the practicality tends to decrease.

As such a thermally expansible thermoplastic resin particle (i.e., expansible particle), Matsumoto Microsphere F series (Trademark) available from Matsumoto Yushi Seiyaku K.K. and Expancel (Trademark) available from Nihon Fillite K.K. are available from the market.

The thermoplastic resins constituting the outer shell component of the above-mentioned gas-encapsulated thermoplastic resin particles are preferably those providing an expansion starting temperature of from 70° C. to less than 120° C. and, capable of withstanding the vulcanization of a rubber. Examples of such thermoplastic resins are preferably (meth)acrylonitrile polymers, copolymers having a high (meth)acrylonitrile content. Examples of the comonomer of the above-mentioned (meth)acrylonitrile copolymers are vinyl halides, vinylidene halides, styrene monomers, (meth) acrylate monomers, vinyl acetate, butadiene, vinyl pyridine, chloroprene Note that the. above-mentioned thermoplastic resins may be made crosslinkable with a crosslinking agent such as divinylbenzene, ethylene glycol di(meth)acrylate, triethylene glycol di(meth)acrylate, trimethylol propane tri (meth)acrylate, 1,3-butylene glycol di(meth)acrylate, allyl (meth)acrylate, triacrylformal, triallylisocyanurate. The crosslinking agent is preferably present in the uncrosslinked state, but may be partially crosslinked to such an extent that the properties as the thermoplastic resins are not impaired.

In many cases, the processing steps prior to the vulcanization of a rubber for a tire usually use a processing temperature of 100–140° C. In the mixing step, for example, the mixing step of a filler such as carbon black, the discharging temperature after mixing is about 160° C. Further, in the next step where a crosslinking agent is added, the mixture is discharged at a temperature of about 110–120° C. so as not to start the crosslinking reaction. Accordingly, according to the present invention, when the thermally expansible thermoplastic resin particle is expanded, the thermally expansible thermoplastic resin particle is also introduced at the time of introduction of a crosslinking agent where a discharge temperature is not extremely increased. The discharge temperature is preferably 100–140° C.

When the thermally expansible thermoplastic resin particle is introduced into such a mixing step that the mixture is discharged at a temperature of 160° C., although the thermally expansible thermoplastic resin particle is expanded during the mixing, the shell of the thermally expansible thermoplastic resin particle becomes too soft and is broken. Furthermore, the thermally expansible thermoplastic resin particle can be expanded even in the extruding step. The extrusion is usually carried out at a temperature of 100–140° C., and therefore, in the case of the expansion starting temperature of less than 120° C., the expansion is sufficiently carried out at the extrusion step.

In the present invention, the thermally expansible thermoplastic resin particle having an expansion starting temperature of from 70° C. to less than 120° C. is used. This is because the particle can be appropriately expanded at the processing temperature range of the rubber composition. If the expansion starting temperature is 120° C. or more, the heating at a temperature higher than the expansion starting temperature should be applied to the particle, there is a danger that a scorching is generated under the condition where a crosslinking agent is already compounded, and therefore, the processing becomes impossible. If the expansion starting temperature is less than 70° C., it is not preferable because the gas-encapsulated thermoplastic resin tend to easily break due to the outer pressure subjected during the processing, whereby the expanded particle is not uniformly dispersed in the rubber, although the expansion easily occurs during the processing. The thermally expansible thermoplastic resin particle alone can be expanded several to several tens times by heating. Furthermore, when a low viscosity substance such as a liquid substance is compounded, the thermally expansible thermoplastic resin particle can be relatively easily expanded. However, in order to effectively expand the thermally expansible thermoplastic resin particle in the material (e.g., a rubber for a tire) where a large amount of a hard filler such as carbon black is compounded, we found that it is effective that the particle is previously expanded upon heating prior to the vulcanization step where a high pressure is applied.

Examples of the liquid or solid substances capable of generating a gas by vaporization, decomposition or chemical reaction upon heating, usable in the present invention, are liquid substances such as hydrocarbons such as n-pentane, isopentane, neopentane, butane, isobutane, hexane, petroleum ether; chlorinated hydrocarbons such as methyl chloride, methylene chloride, dichloroethylene, trichloroethane, trichloroethylene, or solid substances such as azodicarbonamide, dinitrosopentamethylenetetramine, azobisisobutyronitrile, toluenesulfonylhydrazide derivatives, aromatic succinyl hydrazide derivatives.

Examples of diene rubber usable in the rubber composition according to the present invention are natural rubber (NR), various butadiene rubbers (BR), various styrene-butadiene copolymer rubbers (SBR), polyisoprene rubber (IR), acrylonitrile butadiene rubbers (NBR), chloroprene rubber (CR), ethylene-propylene-diene copolymer rubbers (EPDM), styrene-isoprene copolymer rubbers, styrene-isoprene-butadiene copolymer rubbers, isoprene-butadiene copolymer rubbers. These rubbers may be used alone or in any mixture thereof. The diene rubbers, when used as a tire tread according to the present invention, are preferably those having a glass transition temperature (Tg) of −55° C. or less on average, more specifically −60° C. to −100° C. on average, in order to improve the balanced properties of the low rolling resistance with the abrasion resistance and the low temperature performances.

Figure 2:
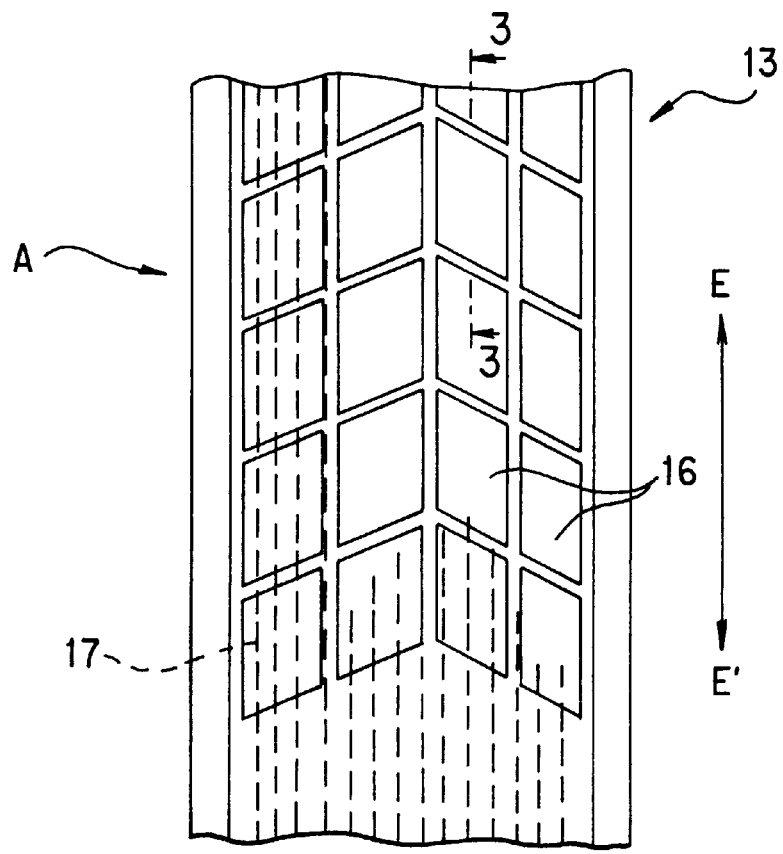
FIG. 2 is a schematic plan view of a tread portion of an example of a pneumatic tire according to the present invention.
Figure 3:
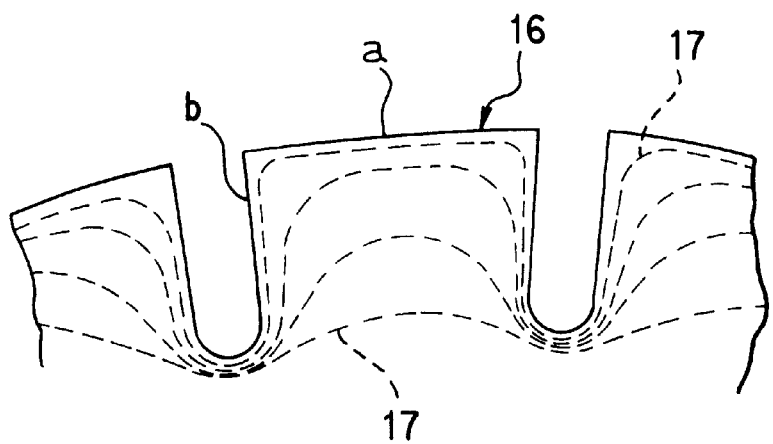
FIG. 3 is a K–K' cross-sectional view of the example of a pneumatic tire of FIG. 2 according to the present invention.

In the rubber composition for a tread portion of a pneumatic tire according to the present invention, in addition to the above rubber and gas-encapsulated thermoplastic resin, a short fiber, a hard particle and/or a liquid polymer are optionally compounded. When a short fiber is used, the short fiber should be oriented substantially along with the front surface and the side surface of a block of a tread portion. The short fiber is oriented along with the front surface and the side surface of a block of a tread portion 13 in the present invention. The orientation manner of the short fiber is shown in FIGS. 2 and 3. FIG. 2 is a schematic plan view of a tread portion of an example of a pneumatic tire according to the present invention and FIG. 3 is a K–K' cross sectional view thereof. As shown in FIGS. 2 and 3, the short fiber 17 is oriented in the direction EE' of a tire circumference along the front surface a and the side surface b of the block 16 of the tread portion 13.

In order to obtain such an orientation of the short fiber, the tendency of the fiber is utilized such that the fiber having a certain length/diameter ratio tends to align in the flowing direction of a matrix (i.e., rubber) during the extrusion molding of the tread portion 13. This tendency causes the flow of the unvulcanized tread rubber along with the mold by the projection portions of the mold when the tire is vulcanized. As a result, the short fiber 17 is oriented along the projection portions of the mold. Thus, the short fiber 17 is oriented along the front surface a and the side surface b of the block 16 of the tread portion 13. However, when the short fiber 17 is too short in the length thereof, the short fiber is randomly arranged, and therefore, no orientation of the short fiber 17 does not occur.

The block 16 containing the short fiber 17 oriented along with the front surface a and the side surface b as mentioned above exhibit the anisotropic elastic modulus, namely the rigidity of the overall block is extremely high, but the elastic modulus in the direction at the right angle from the orientation direction (i.e., the elastic modulus in the inside direction from the surface) is not so high. Due to the generation of this anisotropic elastic modulus, the rigidity of the block composed of the soft base rubber having a high cohesive effect can be reinforced, and therefore, the block edge effects and the rubber cohesive effects can be compatible together at the maximum degree, the tire performances not only on the ice and snow road but also on the general road can be improved. For this reason, in the present invention, the, short fiber 17 is preferably oriented such that the dynamic Young's modulus $E_1$ in the circumference direction of the block and the dynamic Young's modulus $E_2$ in the radial direction of the block satisfy the following equations (1) and (2):

$$1.03 \leq E_1/E_2 \quad (1)$$

$$3 \text{ (MPa)} \leq E_2 \leq 20 \text{ (MPa)} \quad (2)$$

The above-mentioned short fiber preferably has an average diameter of 0.1 μm or more, more preferably 0.1 to 50 μm and an average length of 100–5000 μm, more preferably 100–2000 μm. The preferable ratio of the length/the diameter is 10–1000, more preferably 100–1000. Examples of the short fibers usable in the present invention are those natural fibers such as cotton and silk, chemical fibers such as cellulose fibers, polyamide fibers such as nylon fibers, polyester fibers, polyvinyl alcohol fibers such as vinylon, inorganic fibers such as carbon fibers. Preferably, the short fiber of cellulose such as rayon is used. Metallic short fibers such as steel short fiber, copper short fiber may also be used. Furthermore, to increase the dispersibility in the rubber, surface-treated short fibers or fibers in the form of a masterbatch previously dispersed in SBR, NR, etc. may be preferably used.

The gas-encapsulated thermoplastic resin contained in the rubber composition for a tread portion of a pneumatic tire according to the present invention is contained in an amount of preferably 1–20 parts by weight, more preferably 2–15 parts by weight, based upon 100 parts by weight of the diene rubber. Further, the short fiber is contained preferably in an amount of 1–20 parts by weight, more preferably 1–10 parts by weight, based upon 100 parts by weight of the diene rubber.

The hard particles used in the present invention are intended to be formulated into the rubber composition to thereby obtain the scratch effect against the ice surface. For this reason, the hard particles preferably have a hardness of higher than ice (i.e., a Vickers hardness Hv=30) but lower than asphalt (i.e., Hv=1000), i.e., a Vickers hardness of 35 to 1000, and a preferable average particle size of 20 to 500 μm. When the particle size of the hard particle is less than 20 μm, the scratch effect against the ice is not sufficient, whereas when the particle size is more than 500 μm, the actual contact area with the ice surface becomes too small, and therefore, it is not preferable that the friction force on the ice tends to be small.

The materials usable, as the above-mentioned hard particles, in the present inventions are those having the above-mentioned hardness range. Among these, carbonaceous powder particles such as wood ceramics particles, activated carbon particles; hard synthetic resin particles such as those of nylon resins, polyethylene resins, phenol resins; metal particles of, for example, aluminum, copper, and iron; mineral powders such as those of calcite and fluorite; rice bran ceramics; and the mixtures thereof, etc. These particles may also be used in any mixture thereof.

According to the present invention, 1 to 20 parts by weight, more preferably 1 to 10 parts by weight, of a hard particle, based upon 100 parts by weight of the rubber, is formulated into the rubber composition for a tire tread. When the compounding amount is outside of these ranges, the desired functioning effects cannot be sufficiently obtain in each case.

The liquid polymer (i.e., softening agent) compounded in the rubber composition for a tire tread according to the present invention is a liquid polymer, preferably liquid polybutadiene, liquid polyisoprene, having a weight-average molecular weight of 6,000 to 100,000, preferably 8,000 to 80,000 and a Tg of −50° C. or less, preferably −120° C. to −55° C.

The gas-encapsulated thermoplastic resin compounded rubber form the irregularity on the surface of a tread, whereby the water film is effectively removed. Further, since the gas-encapsulated thermoplastic resin having elasticity is compounded, the hardness of the rubber is not increased, the softness or flexibility of the rubber is maintained and the high friction force on ice is provided. However, according to the present invention, the hardness of the rubber is increased with the elapse time. The main reasons thereof are due to the migration of the softening agent into the inside of a tire or the diffusion thereof into the atmosphere. Thus, the above change with the elapse of time can be suppressed by the compounding of the liquid polymer having low migration and diffusion.

The rubber composition for a tire tread according to the present invention contains, as a reinforcing agent conventionally compounded into the rubber composition, carbon black and/or silica formulated therein. The carbon blacks used for the rubber composition according. to the present invention are preferably those having a nitrogen specific surface area ($N_2SA$) of at least 70 m$^2$/g, more preferably 80 to 200 m$^2$/g, and a DBP oil absorption of at least 105 ml/100 g, more preferably 110 to 150 ml/100 g. When the values of $N_2SA$ and DBP oil absorption are too small, the tensile strength and modulus of the rubber composition unpreferably tend to decrease. Contrary to this, when the $N_2SA$ is too large, the heat generation unpreferably tends to increase. The carbon black having a too large DPB oil absorption is difficult to produce. In the case of the silica, precipitated silica (hydrous silica), pyrogenic silica (anhydrous silica) and surface-treated silica may be used. Among these types of silica, precipitated silica is preferably-used. The amount of these reinforcing agents to be formulated are preferably, based upon 100 parts by weight of the rubber in the rubber composition, 20 to 80 parts by weight, preferably 30–70 parts by weight, of carbon black and 0–50 parts by weight, preferably 10–30 parts by weight, of silica. Silica is not necessary to use in the rubber composition according to the present invention. When the silica is used in the rubber composition, it is preferable to use in such an amount that the balance of tan$\delta$ (0° C.) and tan$\delta$ (60° C.) is improved. When the amount of silica is too large, the electric conductivity tends to decrease and the cohesive force of the reinforcing agent tends to become strong, whereby the dispersibility during the mixing tends to be insufficient.

The rubber composition for a tire tread according to the present invention may optionally contain any compounding agents normally used in the rubber industry, for example, vulcanization or crosslinking agent, various oils, an antioxidant, a vulcanization or vulcanization accelerator, a filler, a plasticizer, a softening agent. The amounts of these compounding agents may be any conventional amount unless the objects of the present invention are impaired.

The mixing and the premolding of the thermally expansible thermoplastic resin particles in the rubber composition for a tire tread according to the present invention are carried out at a temperature of the expansion starting temperature or more, preferably a temperature of more than, by 0–20° C., more preferably by 5–15° C., of the expansion starting temperature. When the temperature is larger than the above ranges, the expanded particles tend to be collapsed due to a large shearing force during the processing. The vulcanization molding temperature is preferably carried out at a temperature of ±20° C. of the maximum expansion temperature $T_{max}$ of the thermally expansible resin particles, so that the optimum physical properties of the rubber material can be exhibited.

As a result of the above production method, the rubber molded product having a structure such that the gas-encapsulated thermoplastic resin particles in the form of a spherical shell having an average particle size of 30–150 $\mu$m is uniformly and three-dimensionally dispersed in the matrix of the vulcanized rubber can be obtained. When the rubber composition for a tire tread having the structure obtained above is used as a pneumatic tire, the gas-encapsulated thermoplastic resin particles appear on the top of the tread surface as the tread portion is worn due to the above-mentioned structure. Thus, a large number of the projected portions are formed on the surface of the tread portion. At the same time, a large number of the graved portions are also formed due to the removal of the particles from the tread surface. Thus, the water-film on the ice is effectively removed therefrom, whereby the actual contactness is improved and the friction performance on the ice is improved. Furthermore, since the elastic gas-encapsulated resin is compounded, the flexibility of the tire tread can be maintained, without increasing the hardness of the tire rubber.

EXAMPLES

The present invention will now be further illustrated by, but is by no means limited to, the following Examples.

Examples 1–2 and Comparative Examples 1–6
Preparation of Samples

The compounding components such as the rubber, and carbon black, except for the vulcanization agent, sulfur and thermally expansible resin particle, shown in Table I were mixed at a temperature of 160° C. for 5 minutes using a 16 liter closed type Banbury mixer to obtain a masterbatch. After this masterbatch was cooled to a room temperature, the masterbatch thus obtained and the remaining compounding agents were mixed at a 16 liter closed type Banbury mixer and the resultant rubber composition was dumped from the Banbury mixer when the temperature of the rubber composition reached 130° C.

On the other hand, after the rubber composition was cooled to a room temperature, the rubber composition was vulcanized at 180° C. for 10 minutes in the form of a sheet having a thickness of 5 mm. The specific gravity of the resultant vulcanized sheet was determined and the vulcanized sheet was sliced to the thickness of 2 mm and the friction coefficient was determined by carrying out a friction test on ice with respect to the sliced surface.

The results of the specific gravity and the friction test on ice are shown in Table I.
1) Specific Gravity of Vulcanized Rubber (Index)

The weight of the vulcanized rubber sample and the weight thereof in water were measured and the specific gravity of the vulcanized rubber was determined therefrom. The results are indicated indexed to the specific gravity of Comparative Example 1 as 100. The smaller the value, the lower the specific gravity.
2) Friction Test on Ice (ICE-$\mu$) (Index)

The friction test on ice was carried out by forcing the rubber test piece under a constant load onto the surface of ice set in a constant-temperature room under a temperature control and the resistance (i.e., the friction force) when slided at a constant speed. The friction test on ice in Examples and Comparative Examples is carried out under the conditions of a temperature of –3° C., a sliding speed of 25 km/h and a contact pressure of 3 kg/cm$^2$. The results are indicated indexed to the value before aging of Comparative Example 1 as 100. The larger the value, the higher the friction coefficient.

TABLE I

|  | Comp. Ex. 1 | Comp. Ex. 2 | Comp. Ex. 3 | Comp. Ex. 4 | Comp. Ex. 5 | Comp. Ex. 6 | Ex. 1 | Ex. 2 |
| --- | --- | --- | --- | --- | --- | --- | --- | --- |
| Compounding (wt. part) | | | | | | | | |
| NR*[1] | 60 | 60 | 60 | 60 | 60 | 60 | 60 | 60 |
| BR*[2] | 40 | 40 | 40 | 40 | 40 | 40 | 40 | 40 |
| Carbon black*[3] | 50 | 50 | 50 | 50 | 50 | 50 | 50 | 50 |
| Liquid polymer*[4] | 15 | 15 | 15 | 15 | 15 | 15 | 15 | 15 |
| Aromatic oil | 15 | 15 | 15 | 15 | 15 | 15 | 15 | 15 |
| Zinc oxide | 5 | 5 | 5 | 5 | 5 | 5 | 5 | 5 |

TABLE I-continued

|  | Comp. Ex. 1 | Comp. Ex. 2 | Comp. Ex. 3 | Comp. Ex. 4 | Comp. Ex. 5 | Comp. Ex. 6 | Ex. 1 | Ex. 2 |
|---|---|---|---|---|---|---|---|---|
| Stearic acid | 1 | 1 | 1 | 1 | 1 | 1 | 1 | 1 |
| Antioxidant*5 | 3 | 3 | 3 | 3 | 3 | 3 | 3 | 3 |
| Wax | 1 | 1 | 1 | 1 | 1 | 1 | 1 | 1 |
| Sulfur | 1.3 | 1.3 | 1.3 | 1.3 | 1.3 | 1.3 | 1.3 | 1.3 |
| Vulcanization accelerator*6 | 1.5 | 1.5 | 1.5 | 1.5 | 1.5 | 1.5 | 1.5 | 1.5 |
| Matsumoto microsphere-A*7 | — | 3 | 5 | 5 | — | — | — | — |
| Matsumoto microsphere-B*8 | — | — | — | — | — | 5 | 5 | 5 |
| Matsumoto microsphere-C*9 | — | — | — | — | 5 | — | — | — |
| Discharge temp. (° C.) when mixing | 125 | 125 | 115 | 125 | 125 | 100 | 115 | 125 |
| Expansion step | Vulcanization | Vulcanization | Vulcanization | Vulcanization | — | Vulcanization | Mixing | Mixing |
| Evaluation of Physical Property |  |  |  |  |  |  |  |  |
| Specific gravity of vulcanized rubber (Index) | 100 | 100 | 100 | 99 | 100 | 99 | 82 | 81 |
| Friction coefficient on ice (Index) | 100 | 98 | 100 | 102 | 95 | 102 | 120 | 122 |

Footnote of Table I
*1Natural Rubber TTR20
*2NIPOL 1220 (Polybutadiene rubber manufactured by Nippon Zeon)
*3SHOBLACK N220 (Showa Cabot)
*4Polyoil 130 (Liquid polybutadiene manufactured by Nippon Zeon, Average molecular weight: 16000, Tg: −82° C.)
*5SANTOFLEX 6PPD (FLEXSIS Co.)
*6Noccelar NS-F (Ouchi Shinko Kagaku)
*7Microsphere manufactured by Matsumoto Yushi Seiyaku (Expansion starting temp: 130–135° C.)
*8Microsphere manufactured by Matsumoto Yushi Seiyaku (Expansion starting temp: 105–110° C.)
*9Microsphere manufactured by Matsumoto Yushi Seiyaku (Expanded grade)

Examples 3–8 and Comparative Examples 7–8

Preparation of Samples

The compounding components such as rubber, carbon black, etc., except for the vulcanization accelerator, sulfur and the hollow polymer, shown in Table II were mixed at 160° C. for 5 minutes using a 16 liter closed type Banbury mixer to obtain a masterbatch. After the masterbatch was cooled to a room temperature, the masterbatch and the remaining compounding agents were mixed in a 16 liter closed type Banbury mixer and the resultant rubber composition was dumped from the Banbury mixer when the temperature of the rubber reached 130° C.

The results of ICE-$\mu$(friction test on ice) of the resultant rubber composition and the aged ICE-$\mu$ after aging in an oven at 80° C. for 96 hours are shown in Table II.

TABLE II

|  | Comp. Ex. 7 | Comp. Ex. 8 | Ex. 3 | Ex. 4 | Ex. 5 | Ex. 6 | Ex. 7 | Ex. 8 |
|---|---|---|---|---|---|---|---|---|
| Compounding (wt. part) |  |  |  |  |  |  |  |  |
| NR*1 | 60 | 60 | 60 | 60 | 60 | 60 | 60 | 60 |
| BR*1 | 40 | 40 | 40 | 40 | 40 | 40 | 40 | 40 |
| CB*1 | 50 | 50 | 50 | 50 | 50 | 50 | 50 | 50 |
| Liquid polymer*1 | — | 15 | 15 | 15 | 15 | 15 | — | — |
| Aromatic oil | 15 | 15 | 15 | 15 | 15 | 15 | 15 | 15 |
| Zinc oxide | 5 | 5 | 5 | 5 | 5 | 5 | 5 | 5 |
| Stearic acid | 1 | 1 | 1 | 1 | 1 | 1 | 1 | 1 |
| Antioxidant*1 | 3 | 3 | 3 | 3 | 3 | 3 | 3 | 3 |
| Wax | 1 | 1 | 1 | 1 | 1 | 1 | 1 | 1 |
| Sulfur | 1.3 | 1.3 | 1.3 | 1.3 | 1.3 | 1.3 | 1.3 | 1.3 |
| Vulcanization accelerator*1 | 1.5 | 1.5 | 1.5 | 1.5 | 1.5 | 1.5 | 1.5 | 1.5 |
| Matsumoto microsphere-*2 | — | — | 5 | 5 | 5 | 5 | 5 | 5 |
| UBSHP-HA1060*3 | — | — | — | 3 | — | 1.5 | — | 1.5 |
| RB Ceramics*4 | — | — | — | — | 3 | 1.5 | — | 1.5 |
| Evaluation of Physical Property |  |  |  |  |  |  |  |  |
| Index of friction coefficient index (Before heat aging) | 98 | 100 | 120 | 123 | 125 | 128 | 117 | 123 |
| Index of friction coefficient index (After heat aging) | 90 | 98 | 117 | 120 | 121 | 123 | 108 | 110 |

Footnote of Table II
*1See footnote of Table I
*2Matsumoto Yushi Seiyaku (Expansion starting temp.: 105–110° C., Discharged at the expansion starting temp. or more during the mixing)
*3Short fiber manufactured by Ube Kosan
*4Hard porous carbonaceous particle manufactured by Sanwa Yushi, Hv: about 400, Average particle size: 100–150 $\mu$m

INDUSTRIAL APPLICABILITY

According to the present invention, when the hollow polymer compounded in the rubber is expanded at the expansion starting temperature or more, prior to the vulcanization step, the larger expansion can be obtained when compared with the case where the expansion is carried out during the vulcanization, the specific gravity of the vulcanized rubber is further decreased, whereby the weight can be further lightened.

Furthermore, when the hollow polymer is compounded into a tread rubber for a stadless tire, larger recess can be formed on the surface of a tread and therefore, the friction force on ice is further remarkably improved. Still furthermore, when the short fiber is compounded, the block stiffiness is improved and the contactness to the road of the tread block is improved. When the hard particle is compounded, the convex portion of the tread surface generated exhibits the spike effect and the recess portion exhibits the effect for removing the water-film on ice. When the liquid polymer is compounded, the increase in the hardness of the rubber with the elapse of time can be suppressed and the flexibility of the rubber can be maintained.

Explanation of Numeral Reference in Drawings

10 . . . Tread Surface
11 . . . Bead Portion
12 . . . Sidewall
13 . . . Tread Portion
14 . . . Carcass Layer
15 . . . Belt Layer
16 . . . Block
17 . . . Short Fiber

What is claimed is:

1. A rubber composition for a tire tread comprising:
   100 parts by weight of a diene rubber;
   30–90 parts by weight of at lest one reinforcing filler selected from the group consisting of carbon blacks and silicas; and
   a gas-encapsulated thermoplastic resin particle having an average particle size of 30–150 μm obtained by expanding, upon heating, 1–20 parts by weight of a thermally expansible thermoplastic resin particle containing therein a liquid or solid substance, which is capable of generating a gas by vaporization, decomposition or chemical reaction upon heating, at a temperature of an expansion starting temperature thereof or more, followed by vulcanization, said thermally expansible thermoplastic resin particle comprising a thermoplastic resin having an expansion starting temperature of from 70° C. to less than 120° C. and having a heat resistance to withstand the vulcanization of a rubber.

2. The rubber composition for a tire tread as claimed in claim 1, wherein a volume ratio of a hollow portion of the glass-encapsulated thermoplastic resin particle is 2–40%.

3. The rubber composition for a tire tread as claimed in claim 1, wherein the diene rubber has an average glass transition temperature (Tg) of −55° C. or less.

4. The rubber composition for tire tread as claimed in claim 1, wherein said carbon black has a nitrogen adsorption specific surface area ($N_2SA$) of 70 $m^2/g$ or more and a DBP oil absorption of 105 ml/100 g or more.

5. The rubber composition for a tire tread as claimed in claim 1, wherein said thermoplastic resin is an acrylonitrile based copolymer.

6. A pneumatic tire comprising, as a rubber composition for a tire tread portion, the rubber composition according to claim 1.

7. The rubber composition for a tire tread as claimed in claim 1, further comprising 1 to 20 parts by weight of at least one member selected from the group consisting of a short fiber and a hard particle having a Vickers hardness of 35–1000 and an average particle size of 20 to 500 μm.

8. The rubber composition for a tire as claimed in claim 7, wherein said short fiber has an average diameter of 0.1 μm or more and an average length of 100–5000 μm.

9. A pneumatic tire, wherein a tread portion thereof is composed of a rubber composition for a tire tread portion according to claim 7 and said short fiber is oriented along with the front surface and the side surface of a block of the tread portion, and/or said hard particle is three-dimentionally uniformly dispersed in the tread portion.

10. A process for producing a rubber composition for a tire tread comprising:
    heating a mixture of a diene rubber with a thermally expansible thermoplastic resin particle having an expansion starting temperature of from 70° to less than 120° C. and having a heat resistance to withstand the vulcanization of a rubber and containing an encapsulated liquid or solid substance, which is capable of generating a gas by evaporation, decomposition or chemical reaction, at a temperature of the expansion starting temperature of the thermally expansible particle or more to expand the particle, after or during the uniform mixing of the mixture; and
    vulcanizing the expanded particle to uniformly disperse the gas-encapsulated thermoplastic resin particle having an average particle size of 30–150 μm in the rubber.

11. The process for producing a rubber composition for a tire tread as claimed in claim 10, further compounding at least one member selected from the group consisting of a short fiber and a hard particle having a Vickers hardness of 35–1000 and an average particle size of 20 to 500 μm in the rubber.

12. A rubber composition for a tire tread comprising:
    100 parts by weight of a diene rubber;
    30–90 parts by weight of at lest one reinforcing filler selected from the group consisting of carbon blacks and silicas;
    a gas-encapsulated thermoplastic resin particle obtained by expanding, upon heating, 1–20 parts by weight of a thermally expansible thermoplastic resin particle containing therein a liquid or solid substance, which is capable of generating a gas by vaporization, decomposition or chemical reaction upon heating, at a temperature of an expansion starting temperature thereof or more, followed by vulcanization, said thermally expansible thermoplastic resin particle comprising a thermoplastic resin having an expansion starting temperature of from 70° C. to less than 120° C. and having a heat resistance to withstand the vulcanization of a rubber; and
    5–55 parts by weight of a liquid polymer having a weight-average molecular weight of 6,000–100,000 and a glass transition temperature (Tg) of −50° C. or less.

13. The rubber composition for a tire tread as claimed in claim 12, wherein a volume ratio of a hollow portion of the glass-encapsulated thermoplastic resin particle is 2–40%.

14. The rubber composition for a tire tread as claimed in claim 12, wherein the diene rubber has an average glass transition temperature (Tg) of −55° C. or less.

15. The rubber composition for tire tread as claimed in claim 12, wherein said carbon black has a nitrogen adsorption specific surface area ($N_2SA$) of 70 $m^2/g$ or more and a DBP oil absorption of 105 ml/100 g or more and wherein 0–50 parts by weight, 100 parts by weight of the diene rubber, of a precipitated silica is further contained.

16. A pneumatic tire using, as a rubber composition for a tire tread portion, the rubber composition according claim 12.

* * * * *